United States Patent [19]

O'Herron

[11] Patent Number: 4,830,559
[45] Date of Patent: May 16, 1989

[54] SELF LUBRICATING NUT
[75] Inventor: Michael O'Herron, Topping, Va.
[73] Assignee: Rampart Packaging Inc., Williamsburg, Va.
[21] Appl. No.: 172,892
[22] Filed: Mar. 25, 1988
[51] Int. Cl.⁴ ............................................. F16B 37/00
[52] U.S. Cl. .................... 411/428; 184/109; 411/437
[58] Field of Search ................ 411/428, 258, 82, 437, 411/304; 184/109

[56] References Cited
U.S. PATENT DOCUMENTS

| 360,676 | 4/1887 | Gaines | 411/428 |
|---|---|---|---|
| 908,343 | 12/1908 | Shreve et al. | 184/109 X |
| 1,254,514 | 1/1918 | Lehmann | 411/429 |
| 1,324,867 | 12/1919 | Wilson | 411/428 |
| 1,561,679 | 11/1925 | Woodring et al. | |
| 2,064,377 | 12/1936 | Gordon | 411/428 |
| 2,518,468 | 8/1950 | Harding | 411/428 X |
| 2,663,213 | 12/1953 | Davidson et al. | 411/428 X |
| 2,896,495 | 7/1959 | Crawford | 411/437 |
| 3,519,232 | 7/1970 | Hammonds et al. | 411/428 X |
| 4,741,231 | 5/1988 | Patterson et al. | 82/27 X |

FOREIGN PATENT DOCUMENTS

| 11141 | 3/1903 | Austria | 411/437 |
|---|---|---|---|
| 613415 | 1/1961 | Canada | 411/258 |
| 217358 | 5/1967 | U.S.S.R. | 411/428 |

Primary Examiner—Lloyd A. Gall
Assistant Examiner—Curtis B. Brueske
Attorney, Agent, or Firm—Donald F. Haas

[57] ABSTRACT

A self lubricating nut having a central cavity for insertion of a bolt, a lubricant passage through said nut which opens into an internal bored circumferential gland, and at least one internal bored axial gland which crosses said circumferential gland.

2 Claims, 1 Drawing Sheet

SELF LUBRICATING NUT

BACKGROUND OF THE INVENTION

It is well known that nuts used in heavy machinery and other types of apparatus frequently have the disadvantage of becoming frozen from heat or friction or rusted in so tightly as to cause the nuts and bolts to become practically welded together, especially when steel, iron or similar materials are employed. Thus, it is well recognized that such nuts must be lubricated from time to time. However, proper lubrication of such nuts often requires dismantling of the nut and the bolt which can be time consuming and cause shutdown of the entire machine for a considerable period of time. To avoid this, there have been a number of attempts to develop lubricating or lubricated nuts for use in such applications.

I have developed a self lubricating nut which is capable of being lubricated without requiring dismantling of the nut and the bolt. Further, my nut can be lubricated with only a minor movement of the nut relative to the bolt to avoid disruption of the alignment of the apparatus in which the nut and bolt are incorporated.

SUMMARY OF THE INVENTION

My invention is a self lubricating nut which has a central cavity for insertion of a bolt and a passage to allow lubricant to move from the exterior of the nut to the interior of the nut. The lubricant passage opens into an internal bored circumferential gland through which the lubricant may move. There is at least one internal bored axial gland which crosses the circumferential gland and through which lubricant may also move. It is preferred that there be four internal bored axial glands so that there can be complete dispersal of the lubricant evenly throughout the nut after only a 90° rotation of the nut.

DETAILED DESCRIPTION OF THE INVENTION

Figure 1:
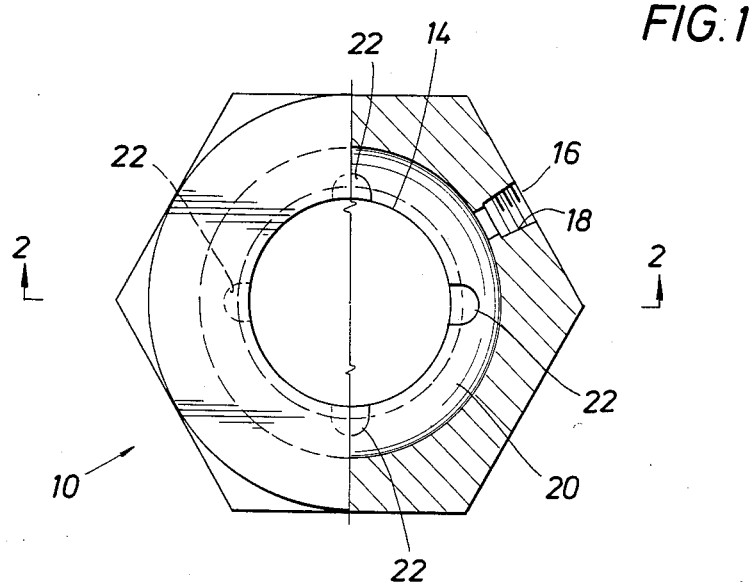
FIG. 1 is a top view with the right half cut away to show the circumferential gland and the lubricant passage.
Figure 2:
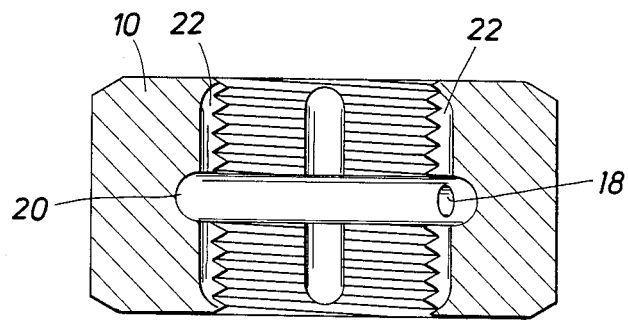
FIG. 2 is a sectional view of the nut of the present invention across line 2—2 of FIG. 1 wherein a bolt could be inserted in the central cavity.

FIGS. 1 and 2 illustrate a nut 10 with bolt inserted in the central cavity 14 of the nut 10. Lubricant may pass through opening 16 into lubricant passage 18 which opens into the internal bored circumferential gland 20 which is bored into the nut threads. There are four internal bored axial glands 22 which are bored into the nut threads which cross circumferential gland 20.

The self lubricating nut 10 is lubricated as follows. The lubricant enters through opening 16 into passage 18 and then on to circumferential gland 20. From circumferential gland 20, the lubricant flows into the axial glands 22. The nut is then rotated 90° and the lubricant is dispersed evenly to the entire affected surface of the bolt and the central cavity 14.

There need be only one axial gland which can evenly disperse lubricant after a 360° rotation of the nut. However, it is preferred that more than one axial gland be used, and highly preferred that four be used, in order to quickly and evenly disperse the lubricant with a minimal amount of disruption of the relationship between the nut and the bolt.

I claim:

1. A self lubricating threaded nut having a central cavity defining first and second openings in the nut for insertion of a bolt, a lubricant passage through said nut defining a third opening in the nut which opens into an internal bored circumferential gland bored into said threads, and at least one internal bored axial gland bored into said threads which crosses said circumferential gland wherein said axial gland is in open communication with said central cavity along the entire length of said axial gland.

2. The self lubricating nut of claim 1 wherein there are four internal bored axial glands.

* * * * *